INVENTOR.
George K. Newell
BY
Adelbert A. Steinmiller
ATTORNEY

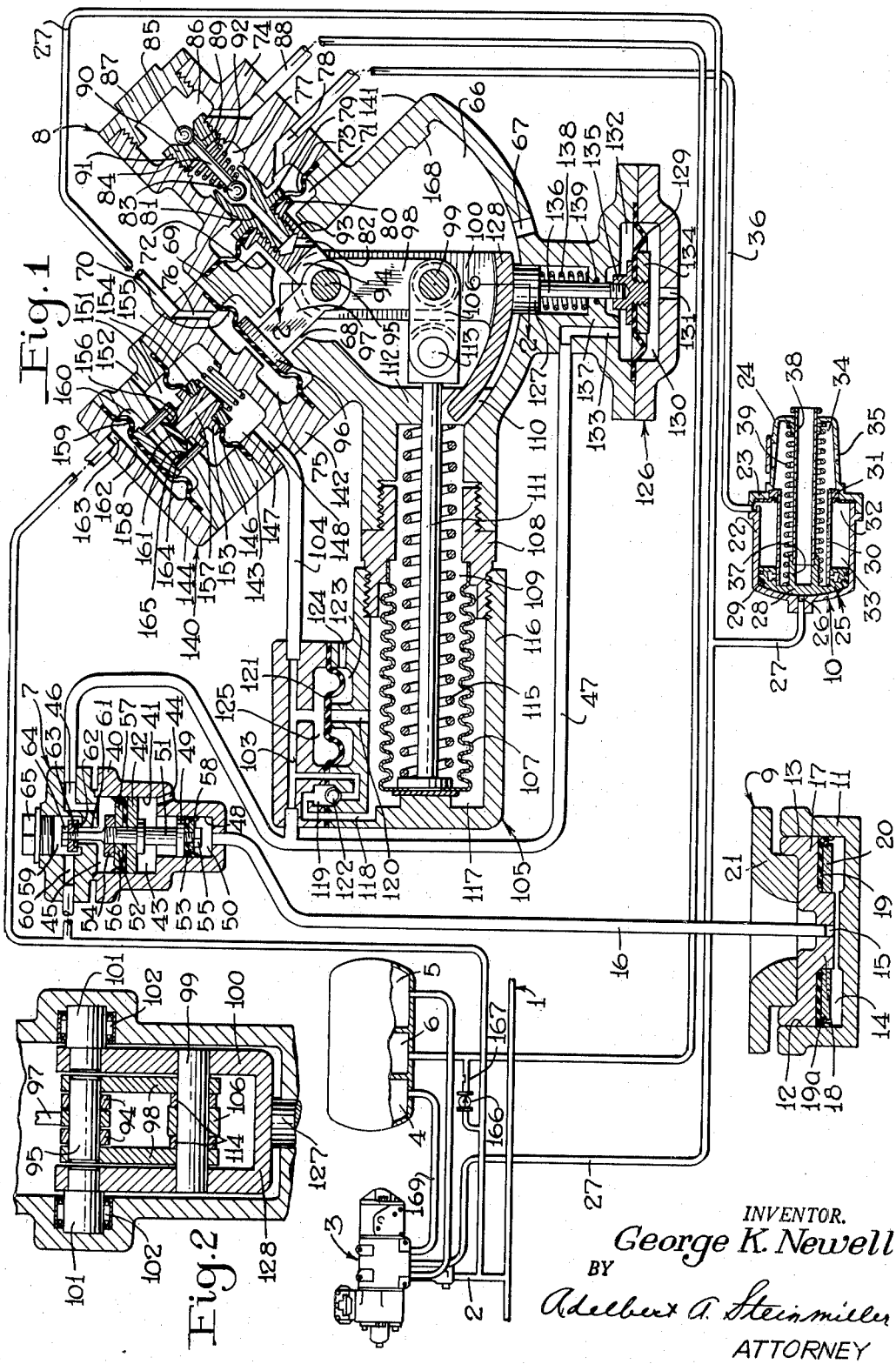

United States Patent Office 2,720,429
Patented Oct. 11, 1955

2,720,429

COMPENSATING VALVE DEVICE FOR LOAD COMPENSATING BRAKE EQUIPMENT

George K. Newell, Level Green, Penn Township, Westmoreland County, Pa., assignor to Westinghouse Air Brake Company, Wilmerding, Pa., a corporation of Pennsylvania Application December 15, 1951, Serial No. 261,895

5 Claims. (Cl. 303—22)

This invention relates to compensating valve devices and more particularly to compensating valve devices adapted for use in variable load brake equipment of a type for varying the degree of braking of a vehicle or car in accordance with the weight of the car which varies according to the empty or loaded condition thereof.

In a brake equipment shown and described in a copending patent application, Serial No. 141,092, of M. B. Cameron et al., filed January 28, 1950, now Patent No. 2,696,830, issued December 14, 1954, and assigned to the assignee of the present application, there is disclosed a brake cylinder device embodying a piston adapted to be operatively connected to the usual brake rigging of a vehicle and arranged to be actuated for applying force to the brake shoe or shoes by action of pressure of fluid in the usual pressure chamber at the one side of said piston as controlled by the well-known AB valve, against the opposing pressure of fluid in a compensating chamber at its opposite side, which latter pressure is varied upon supply of fluid under pressure to said usual chamber in inverse proportion to the degree of load on the car by a novel and improved relay valve device that is sensitive to changes in load as detected by a fluid compression chamber located between the car and truck center plates for one of the car trucks.

The principal object of this invention is to provide a load compensating relay valve device which employs novel and improved means for accurately varying the pressure of fluid in a compensating chamber of a brake cylinder device, such as above described, in accordance with the load on the vehicle.

Figure 3:
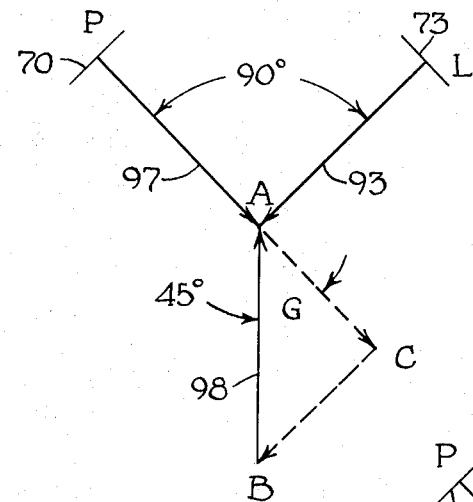
Figure 4:
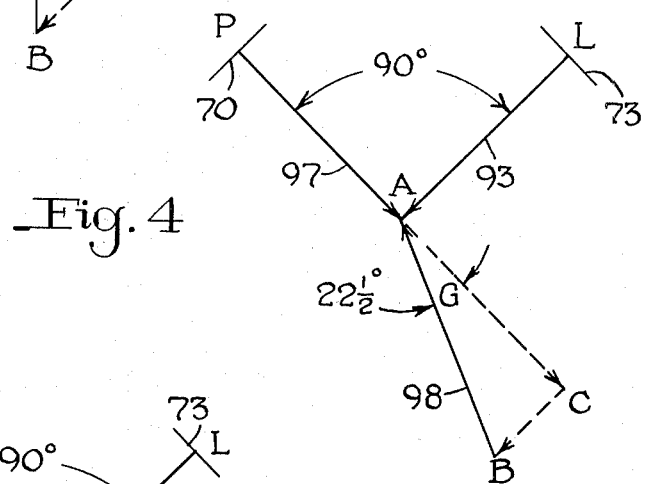
Figure 5:
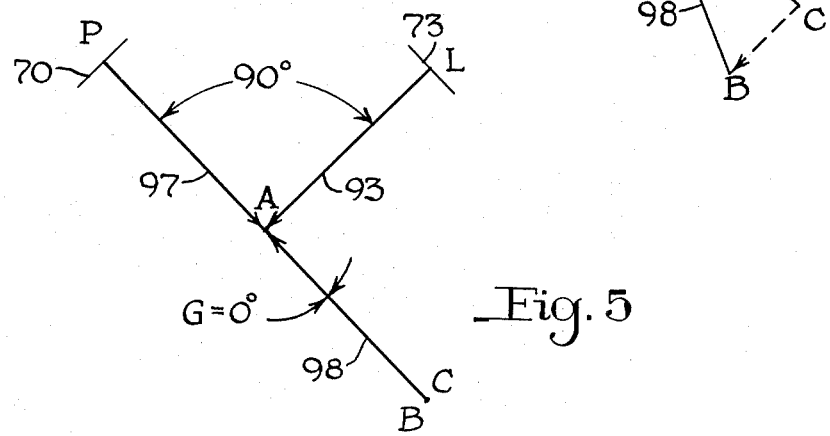

Other objects and advantages will become apparent in the following more detailed description of the invention taken in connection with the accompanying drawings wherein Fig. 1 is a diagrammatic view partly in section of a variable load brake equipment embodying the invention, Fig. 2 is a sectional view of a portion of Fig. 1 taken on the lines 2—2, and Figs. 3, 4 and 5 are schematic diagrams of a portion of said equipment positioned for braking an empty, half-loaded and fully loaded vehicle respectively.

*Description*

As shown in the drawing, the load compensating fluid pressure brake equipment may comprise the usual brake pipe indicated by the reference numeral 1, a branch pipe 2, a brake controlling valve device 3, an auxiliary reservoir 4, an emergency reservoir 5, a load compensating reservoir 6, a relay valve device 7, a load compensating valve device 8, a load measuring mechanism 9, and a brake cylinder device 10.

The brake controlling valve device 3 may be of substantially the same construction and have the same operating characteristics as the "AB" valve device fully described in the patent to Clyde C. Farmer, No. 2,031,213, issued February 18, 1936, and in view of this it is deemed unnecessary to show and describe this device in detail. It will be understood, of course, that valve device 3 operates upon a service reduction in pressure in brake pipe 1 to supply fluid under pressure to effect a service application of the brakes, upon an emergency reduction in pressure in said brake pipe to effect an emergency application of the brakes, and upon an increase in pressure in said brake pipe to effect a release of the brakes and the charging of the brake equipment.

It is preferred for this invention that the load compensating valve device 8 be adjusted according to the load on the vehicle by a load measuring mechanism which is operative independent of the springs supporting the vehicle body, said mechanism comprising a body portion 11, which serves as the center plate of one of the supporting trucks (not shown) of the car. This body portion 11 has formed therein a centrally located vertical cylinder 12 which is closed at its upper end by a piston assemblage 13, thereby defining in part a chamber 14, which is connected by a passage 15 in said assemblage and a conduit 16 to the relay valve device 7.

The piston assemblage 13 comprises a piston body 17 which is provided at its lower side, as viewed in the drawing, with a downwardly extending hub 18, upon which an annular packing cup 19 is secured in place by means of a follower portion 20 attached to the hub 18 by any suitable means (not shown) and expanded radially outward by means of a ring 19a. The piston assemblage 13 is arranged to support a follower 21 which serves as a center plate for the car body (not shown). Thus the weight on the piston assemblage 13, and consequently the degree of hydraulic pressure in chamber 14, is varied by changes in weight of the load on the car body.

The brake cylinder device 10 comprises a hollow cup-shaped casing 22, to the open end of which is secured an annular pressure head 23 from which projects a hollow cup-shaped non-pressure head 24. A brake cylinder piston 25 is slidably mounted in the casing 22 and at one side thereof is the usual or main pressure chamber 26 to which is connected a brake cylinder pipe 27 leading from the brake controlling valve device 3.

The brake cylinder piston 25 comprises a piston head 28, to one face of which is connected a flexible packing cup 29 for preventing leakage of fluid under pressure from pressure chamber 26 to the opposite side of the piston. Secured at one end and projecting from piston 25 in a direction away from the pressure chamber 26 is a hollow stem 30, the opposite end of which is slidably mounted in a ring 31 secured in the pressure head 23. Carried by the pressure head 23 and ring 31 is a packing cup or sealing ring 32 having sealing and sliding contact with the outer peripheral surface of the stem 30 for preventing leakage of fluid under pressure from a compensating, or counter-pressure, chamber 33 formed around said stem between the pressure head 23 and the piston 25, to a non-pressure chamber 34 formed within said stem and open to the interior of the non-pressure head 24 and thence to atmosphere through a port 35 in said non-pressure head. The pressure chamber 33 is open to a compensating pipe 36, through which fluid under pressure is adapted to be supplied to and released from said chamber by operation of the compensating valve device 8, in a manner which will be hereinafter described.

The brake cylinder piston head 28 is provided with a hollow boss 37 projecting into the hollow stem 30 in coaxial relation to said head and stem, and one end of a hollow rod 38 is secured in said boss. The rod 38 extends through the non-pressure head 34 to the exterior thereof, said rod being hollow to accommodate the usual push rod (not shown) for connecting the brake cylinder piston 25 to the brake rigging (not shown) of the car in a conventional manner. Encircling the hollow rod 38 is a brake cylinder piston release spring 39 one end of which bears against the piston head 28 for moving the brake cylinder piston to its brake release position, in which it is shown in the drawing. The opposite end of the release spring 39 is supported on the non-pressure head 24.

The relay valve device 7 is provided for the purpose of translating the hydraulic pressure in chamber 14 of the load measuring mechanism 9 to equivalent air pressure for the purpose of operating the load compensating valve mechanism 8 as will appear later. The relay valve device 7 may comprise a casing 40 having one bore 41 therein, in which is operably mounted a piston 42 having at one side a chamber 43 which is always open to atmosphere through a port 44 in said casing, and at the other side a chamber 45 which is in constant communication with the valve mechanism 8 by way of a passage 46 and a conduit 47. Another bore 48, having a smaller diameter than bore 41 and in coaxial alignment therewith, is provided in casing 40 and has operably mounted therein a piston 49 having chamber 43 at one side and at the other side a chamber 50, which is connected to load measuring mechanism 9 through pipe 16.

The pistons 42 and 49 are rigidly attached to a common stem 51 by means of followers 52, 53 and nuts 54. 55, respectively, piston 42 having a packing cup 56 pressed outwardly against a wall of bore 41 by a spring 57 and piston 49 having a packing cup 58 in sealing contact with a wall of bore 48.

At the upper end of the casing 40 there is provided a valve chamber 59 which is constantly connected to brake pipe 1 by way of a passage 60 and may be connected to chamber 45 by way of an opening 61 in said casing. The opening 61 is encircled at its upper end by a valve seat 62 which may be operatively engaged by a valve 63, secured by means of a nut 64 in chamber 45 to the upper end of piston stem 51 for movement by said stem. The chamber 59 is closed at the top by a cap nut 65.

In the load compensating valve mechanism 8, a casing 141 has a central chamber 66, which is open to atmosphere through an opening 67 in the bottom of the casing. The chamber 66 is connected through an opening 68 at one side of the top of the casing 141 to a chamber 69, which chamber is closed at the side opposite to the opening 68 by a diaphragm 70 clamped at its periphery between the casing 141 and a body section 142. Another chamber 71 is connected through an opening 72 in the top of the casing located at the side of the top opposite to the opening 68, which chamber 71 is closed at its outer end by a diaphragm 73 clamped between the casing 141 and a cover section 74. Defined by diaphragm 70 and a base portion 142 is a control chamber 75 which is connected by way of a passage 76 in said base portion 142 to the brake cylinder pipe 27 leading to the brake controlling valve device 3. Defined by diaphragm 73 and cover section 74 is a delivery chamber 77, which is always connected by way of a passage 78 in said cover section to the load compensating pipe 36 leading to chamber 33 in the brake cylinder device 10.

Contained in chamber 77 is a follower 79 for diaphragm 73, which follower has screw-threaded engagement with a nut extension 80 contained in chamber 77, thereby clamping said diaphragm on its periphery. The nut 80 is provided with a through axial passage 81 which connects chamber 77 with atmospheric chamber 66 by way of a port 82 in follower 79. The outer end of the passage 81 is adapted to be closed by a ball-shaped release valve 83 contained in chamber 77 and integrally connected by means of a stem 84 to a ball-shaped supply valve 85 contained in a supply chamber 86. Chamber 86 formed in cover section 74 and closed at its outer end by a cap nut 87 is in constant open communication with the supplementary, or load compensating, reservoir 6 by way of a connected passage and pipe 88, and may communicate with supply chamber 86 by way of a passage 89 in a bushing 90 mounted by screw-threaded means 91 in cover section 74, passage 89 being adapted to be closed at its outer end by the supply valve 85. A spring 92 is operatively mounted in chamber 77 between bushing 90 and release valve 83 so as to constantly urge valves 83 and 85 toward their seated positions.

It will be noted that all the parts described in the preceding paragraph are in axial alignment and that upon outward movement of diaphragm 73 from the position in which it is shown in the drawing, nut 80 will first engage the release valve 83, closing communication between chambers 77 and passage 81, and then, through the medium of stem 84 actuate supply valve 85 out of engagement with bushing 90, thereby opening passage 89 to chamber 86 to permit flow of fluid under pressure from chamber 86 to chamber 77. The initial part of return movement of diaphragm 73 from this position in which the supply valve 85 is open will cause said supply valve 85 to engage bushing 90, thereby defining a lap position in which both valves 83 and 85 are seated. Further inward movement of diaphragm 73 will cause nut 80 to unseat valve 83, opening chamber 77 to atmospheric chamber 66 through passage 81 and port 82 and then the various parts just described will again be in the position in which they are shown in Fig. 1 of the drawings.

The nut 80 is provided with an integral coaxial stem 93, which extends through opening 72 into chamber 66 and terminates at its inner end in a clevis 94 for rockable mounting on a shaft 95. Similarly, a follower 96 is provided in chamber 69 for diaphragm 70 and has formed integral therewith a coaxial stem 97, which extends through opening 68 into chamber 66, where it is also rockably mounted on shaft 95 within the clevis 94. It is preferred that the stems 93 and 97 be disposed with their axes at an angle of 90 degrees to each other and at angles of 45° from opposite sides of a vertical plane as viewed in the drawing, in order to obtain a full range of ratios from zero to 100% as will be explained more fully hereinafter.

As best seen in Fig. 2, an equalizing, or balancing, strut 98 is rockably mounted at one end on shaft 95, outwardly of clevis 94, while another strut 98 is similarly mounted on the opposite end of said shaft for supporting same. The struts 98 are in turn rockably supported at their opposite or lower ends on a shaft 99 intermediate its ends, the ends of the shaft 99 being carried in the lower closed portion of a yoke or supporting member 100. The upper end of yoke 100 is supported at opposite sides of the two struts on respective stub shafts 101, each of which is journaled in one of two opposite inner walls of casing 141 by means of bearings 102, which, as shown in the drawing, are in coaxial alignment with shaft 95 and parallel to the axis of shaft 99.

An actuating mechanism 105, constituting a part of the load compensating valve mechanism 8, is provided for the purpose of operating through the medium of a link 106 to rock the yoke 100 about the stub shafts 99. This actuating mechanism 105 comprises an elongated hollow, or cup-shaped, bellows diaphragm 107 bonded about its edge at the open end to a nipple portion 108 screwed into a portion of casing 65, thereby defining within the diaphragm a chamber 109 which is connected to atmospheric chamber 66 through an opening 110 in said casing. Contained in chamber 109 and abutting the inside of the outer end wall of the diaphragm 106 is a follower and stem 111, which extends through a suitable opening in a wall 112 of casing 141 and makes a pivotal connection with one end of link 106 by means of a pin 113, which link is pivotally connected at the other end to pin 99, between a pair of bushings 114. A spring 115 contained in chamber 109 urges follower 111 toward the position in which it is shown in the drawing.

The actuating mechanism 105 further comprises a closure portion 116 which makes screw-threaded connection with the nipple portion 108, thereby defining a chamber 117 around and over the opposite and closed end of diaphragm 107 which is connected through a passage 118 to a chamber 119 and through a passage 120 to the seat of a valved diaphragm 121. The chamber 117 contains a ball check valve 122 which permits flow of fluid under pressure only in a direction away from pipe 47 through passage 103 to chamber 119. At the seating face of valved diaphragm 121 is a chamber 123 which is constantly open to atmosphere through a passage 124. At the opposite side of diaphragm 120 is a chamber 125 which is always open to passage 103 leading to pipe 47 and also to a cut-off valve device 140 through a pipe 104.

The load compensating valve mechanism 8 further comprises a locking portion 126 which operates in response to pressure of fluid in pipe 47 to actuate a detent 127 out of frictional engagement with a shoe portion 128 of the yoke 100. The locking portion 126 comprises a diaphragm 129 clamped around its edge between two sections of casing 141, said diaphragm having at one side a chamber 130 constantly open to atmosphere through a port 131 in said casing and at the other side a chamber 132 constantly connected to a branch of weighing pipe 47 through a passage 133. Secured to the center of diaphragm 129 by means of a screw-threaded nut 134 is a follower 135 to which is attached a stem 136 integral with the detent 127 which passes through a casing wall 137 between chambers 66 and 132. A spring 138 is interposed between the wall 137 and the detent 127, which urges said detent toward its normal position in contact with shoe portion 128. An annular sealing ring 139 is mounted in a suitable groove in the wall 137 so as to encircle and sealingly engage the stem 136 and said wall and thereby prevent leakage of fluid under pressure from chamber 132 to atmosphere by way of chamber 66 and opening 67.

The cut-off valve device 140 comprises a sectional casing forming a part of the casing 141 for the load compensating valve device 8, and comprising the base portion 142, a body portion 143 and a cover portion 144. Clamped about its periphery between the base portion 142 and the body portion 143 is a diaphragm 146 having at its inner face a chamber 147, which is connected to weighing pipe 47 through passage 148, pipe 104 and passage 103, and having at its outer face a chamber 151, which is constantly open to atmosphere through a port 152. A follower and valve member 153 in chamber 151 is secured to the center of diaphragm 146 by means of a nut 154. Contained in chamber 147 and interposed between the nut 154 and base portion 142 so as to urge diaphragm in an outward direction is a spring 155.

The valve member 153 is provided with an annular valve seat 156 which encircles the mouth of a passage 157, the passage 157 extending through said member and, as will be explained later, arranged to establish communication between chambers 147 and 151. However, this communication is normally cut off by the engagement of valve seat 156 with a stationary valve 158 contained in chamber 151 and fixedly mounted in body portion 145.

Clamped around its periphery between the body portion 143 and cover portion 144 is a dipahragm 159 having at its inner face a chamber 160 which is always connected to atmospheric chamber 151 through openings 161 provided in a wall of body portion 143. At the outer face of diaphragm 159 is a chamber 162 which is constantly connected to brake pipe 1 by way of a passage 163 and branch pipe 2.

The diaphragm 159 is operatively engaged by a follower 164 which is arranged to be actuated outwardly by follower 153 acting through the medium of pins 165 extending through the openings 161 into contact with follower 164.

Operation

In operation, let it be assumed that the brake equipment is initially devoid of fluid under pressure and that to condition said equipment for operation, fluid under pressure is supplied to the brake pipe 1 in the usual manner.

The brake controlling device 3 will respond in the usual manner to the pressure of fluid thus supplied to the brake pipe 1 and branch pipe 2 to charge the auxiliary reservoir 4, and the emergency reservoir 5, and to at the same time open to atmosphere, if not already opened, the brake cylinder pipe 27 and thereby pressure chamber 26 in the brake cylinder device 10. With pipe 27 thus open to atmosphere the pilot diaphragm chamber 75 in the load compensating valve mechanism 8 will also be open to atmosphere by way of passage 76, pipe 27 and the brake controlling valve device 3, which will permit the various parts of the valve mechanism 8 to assume a position in which they are shown in Fig. 1.

With the balancing diaphragm 73 positioned as previously described spring 92 will seat the fluid pressure supply valve 85 and the release valve 83 will be out of contact, or sealing engagement, with its seat on the diaphragm follower 79. With the release valve 83 thus open, chamber 77 and thereby load compensating chamber 33 in the brake cylinder device 10 through pipe 36 and passage 78, will be open to atmosphere by way of passage 81 in said diaphragm follower, port 82, chamber 66 and port 67 in casing 141. With the pressure chambers 10 and 33 in the brake cylinder device 10 both open to atmosphere the brake cylinder piston 25 will assume its brake release position, in which it is shown in the drawing, under the action of the release spring 39.

When fluid under pressure is supplied to the brake pipe 1, and thence to the branch pipe 2, for charging the equipment as above mentioned, fluid will also flow from the branch pipe 2 through a check valve 166 and a choke 167 and pipe 88 to load reservoir 6, and to supply chamber 86 in load compensating valve mechanism 8.

Also, with the fluid pressure brake system devoid of fluid under pressure, chamber 59 in the relay valve device 7 will be at atmospheric pressure. With plate follower 21 being subject to the weight of the load and the weight of the car body the hydraulic fluid in chamber 14 will be constantly under such pressure exerted through the medium of the piston assemblage 13 and communicated by way of passage 15, pipe 16 to chamber 50 in the relay valve device 7. Hydraulic fluid under pressure in chamber 50 will act on piston 49 in an upward direction and through the medium of the piston stem 51 will move the valve 63 upwardly until the nut 54 engages the upper interior surface of chamber 45. With valve 63 unseated pneumatic fluid under pressure supplied to chamber 59 upon charging the brake pipe will flow past the uncovered valve seat 62 into chamber 45, whence it may flow through passage 46, pipe 47, passage 103, pipe 104, and passage 148 to chamber 147, where, as will appear later, it will act in opposition to the fluid pressure in chamber 162 established through branch pipe 2 from brake pipe 1. Fluid under pressure supplied to passage 103 may flow to chamber 125 in the actuating mechanism 105, and also past ball check valve 122, thence to chamber 119 and passage 118 to diaphragm chamber 117, there to act on bellows diaphragm 107 to urge the diaphragm follower and stem 111 in the direction of the right-hand as viewed in Fig. 1 of the drawings.

Fluid under pressure supplied to pipe 47, as just described, also flows through passage 133 to diaphragm chamber 132 in locking portion 126 and acts on diaphragm 129 to urge detent 127 in a downward direction against the pressure of spring 138. When the pressure of fluid in chamber 132 becomes sufficient to prevail over the opposing pressure of spring 138, diaphragm 129 will deflect downwardly, causing the stem 136 to carry the detent 127 out of locking engagement with shoe portion 128 of the yoke member 100. This action just described takes place at approximately 10 to 15 pounds brake pipe pressure.

The yoke 100 now being free from detent 127, may be actuated by bellows diaphragm 107, acting through the medium of the stem 111, pin 113, link 106 and pin 99 and in response to pressure of pneumatic fluid in chamber 117, to a position which corresponds to the degree of load on the vehicle as determined by the load measuring mechanism 9 and translated by the relay valve device 7 to a corresponding pneumatic fluid pressure as explained below.

As previously stated, the piston follower 21 of the load measuring mechanism 9 carries half the weight of the vehicle body, including the weight of the load, this weight, of course, creating a hydraulic pressure in chamber 14, which pressure is transmitted by a suitable hydraulic medium to chamber 50 where it acts on piston 42 in the relay valve device 7. With pipe 47 having been vented to atmosphere, in a manner hereinafter described, piston 42 and valve 63 will have assumed or be in their uppermost positions in which they are shown in Fig. 1. As previously described, during initial charging of fluid pressure brake equipment fluid under pressure will flow from brake pipe 1 to chamber 45 in relay valve device 7 and will act on piston 42 downwardly in opposition to the upwardly directed force exerted by piston 49. This flow will continue until the pneumatic fluid pressure acting on piston 42 will prevail over the hydraulic fluid pressure in chamber 50 and cause piston 42 to carry valve 63 into sealing engagement with valve seat 62. Since the degree of hydraulic pressure in chamber 50 increases as the load on the car increases, it follows that the degree of pneumatic pressure in chamber 147 and acting on diaphragm 107 increases as the load on the car increases.

As the fluid pressure in chamber 147 increases, the diaphragm 107, acting in response to the pressure of fluid supplied thereto, will actuate piston and stem 111 further to the right against the pressure of spring 115 as viewed in Fig. 1, causing yoke 100 and thereby struts 98 to rock in a counter-clockwise direction about stub shafts 101. This rocking action of yoke 100 will continue until communication between branch pipe 2 and chamber 117 is cut off by the seating of valve 63 on valve seat 62 as a result of the operation described in the preceding paragraph.

With the seating of valve 63, flow of pneumatic fluid under pressure to chamber 147 in cut-off valve device 140 is also terminated. However, fluid under pressure will continue to flow to chamber 162 in cut-off valve device 140 since it is connected through passage 163 to branch pipe 2.

If the car is fully loaded, the pneumatic fluid pressure in weighing pipe 47, and consequently in chamber 117 acting on diaphragm 107, will be sufficient against the pressure of spring 115 to actuate the yoke member 100 in a counter-clockwise direction until the yoke member engages a boss 168 formed in the casing 141 and extending into the chamber 66. In this position an imaginary line coinciding with and extending from the axis of stem 97, and corresponding to the line of thrust of diaphragm 70 will pass through the axes of shafts 95 and 99, as best shown in Fig. 5. Consequently, there will be no component of force exerted in the direction of the axis of stem 93 in line of thrust of diaphragm 73, as illustrated diagrammatically in Fig. 5. Therefore, valve 85 will remain seated and valve 83 will remain unseated, thereby connecting chamber 33 in a brake cylinder device 10 to atmosphere through chambers 77, passage 81, port 82, chamber 66 and port 67, as shown in Fig. 1. As a result, brake cylinder pressure in pipe 27 will be ineffective in control chamber 75 of the load compensating valve device 8 and fully effective in pressure chamber 26 acting on piston 25 of the brake cylinder device 10. Thus the fluid pressure brake equipment will be conditioned for braking a fully-loaded vehicle or car.

With further supply of fluid under pressure to chamber 148 in the cut-off valve device 140 cut off by the relay valve device 7 and chamber 162 still connected to brake pipe, as previously noted, fluid pressure in chamber 162 acting on diaphragm 159 will increase to a point sufficient to overcome the combined opposing forces exerted by spring 155 and diaphragm 146, at which time said diaphragm 159 will act through the medium of follower 164 and pins 165 to move valve seat 156 out of engagement with stationary valve 158. It is preferred that this operation take place at a pressure in chamber 162 not exceeding 45 pounds so that an over-reduction of brake pipe pressure at a service rate will not effect an unnecessary operation of the load adjusting mechanism. It will be noted then, if diaphragms 146 and 159 are equal in effective area and opposed to each other, the increase in brake pipe pressure necessary to effect cut-out operation of the cut-off valve device 8 after the relay valve device 7 has cut off weighing pipe 47 is determined by the strength or value of spring 155.

With valve 158 unseated fluid under pressure in chamber 147 will flow through passage 157, chamber 151 and port 156 to atmosphere. Fluid under pressure in chamber 132 will also flow to atmosphere by way of pipe 47, passage 103, pipe 104, passage 148 and presently atmospheric chamber 147. Upon reduction in pressure of fluid in chamber 132 to some predetermined degree, such as 25 pounds, spring 138 will prevail and actuate detent 127 into locking engagement with the shoe portion 128 of yoke member 100. Continued reduction of fluid pressure in passage 103 in a manner just described will permit pressure of fluid in passage 120 acting on the valved diaphragm 121 in opposition to the pressure of fluid in chamber 125 to unseat said valved diaphragm and open passage 120. Fluid under pressure in chamber 117 will then flow to atmosphere by way of passage 120, chamber 123, and port 124.

Referring now to relay valve device 7, the pressure of fluid in chamber 59 acting downwardly on valve 63 will be sufficient to hold said valve seated, during subsequent service reductions of brake pipe pressure, against the hydraulic pressure exerted on piston 49 in chamber 50 since the pressure of fluid in chamber 59 will remain substantially the same as that of a fully charged brake pipe and the pressure of fluid in chamber 45 is substantially at atmosphere.

*Application of brakes on an empty vehicle*

When the vehicle is empty or unladen, and the brake equipment is charged with fluid under pressure valve 63 in the relay valve device 7 will be seated, as shown in Fig. 1. Consequently the fluid in weighing pipe 47 will be at atmospheric pressure and spring 115 will be effective in maintaining the yoke member 100 in its vertical position, in which valve 83 will be unseated and valve 85 will be seated as shown in Fig. 1.

When it is desired to effect an application of the brakes, the brake pipe pressure is reduced in the usual manner, causing the brake controlling valve device 3 to function to supply fluid under pressure from the auxiliary reservoir 4 to pressure chamber 26 in the brake cylinder device 10 in order to advance the usual brake shoes (not shown) into frictional engagement with the vehicle wheels. The flow of fluid under pressure from the auxiliary reservoir 4 to the brake cylinder device 10 is by way of a pipe 169, through the controlling valve device 3 and the brake cylinder pipe 27. At the same time, fluid under pressure flows by way of the pipe 27 and passage 76 to pilot chamber 75 in the load compensating valve mechanism 8. Upon a slight increase in pressure of fluid in chamber 75 diaphragm 70 will be caused to deflect inwardly acting through the medium of follower 96 and stem 97 to rock struts 98, 98 in a clockwise direction on shaft 99; the initial clockwise rocking of struts 98, 98 will bring diaphragm follower 79 into sealing engagement with release valve 83, thereby cutting off the aforementioned connection of chamber 77 with atmosphere, and clockwise rocking thereafter will act through the medium of stem 84 to unseat supply valve 85. Fluid under pressure supplied to chamber 86 will then be permitted to flow past valve 85 and through passage 89 to chamber 77, whence it may flow through passage 78 and pipe 36 to chamber 33 in the brake cylinder device 10.

When the pressure of fluid supplied to chamber 77, as just described, is increased to a degree at which the force exerted by diaphragm 73 plus the force of spring 92 slightly exceeds the opposing force exerted by diaphragm 70, diaphragm 73 will deflect inwardly, rocking struts 98, 98 in a counterclockwise direction about the shaft 99, as viewed in Fig. 1, and permitting spring 92 to act through the medium of valve 83 and spring 84 to seat supply valve 85, at which time equilibrium will be restored with shaft 95 in coaxial alignment with stub shafts 101 as shown.

As will be explained more fully later, the pressure of fluid supplied to chamber 33 in the brake cylinder device 10 with the vehicle empty will be substantially equal to that in chamber 26. Thus the power of the piston head 28 in effecting an application of the brakes is reduced by the opposing force exerted on said head by the pressure of fluid in chamber 33 to that degree appropriate for braking an empty vehicle, as illustrated diagrammatically in Fig. 3 and hereinafter more fully described.

When it is desired to effect a release of the brakes, the brake pipe pressure is increased in the usual manner causing the brake controlling valve device 3 to function to establish communication from the brake cylinder device 10 to atmosphere in the usual manner. Fluid under pressure now flows by way of pipe 27 from pressure chamber 26 in the brake cylinder device 10 to the brake controlling valve device 3, and thence to atmosphere. Brake cylinder device 10 now responds to the release of fluid under pressure therefrom in the usual manner to effect a release of the vehicle brakes. Upon release of fluid under pressure from pipe 27 fluid under pressure will also be released from chamber 75 by way of passage 76, pipe 27 and brake controlling valve device 3.

Upon release of fluid under pressure from chamber 75, the pressure of fluid in chamber 77 will predominate, thereby causing diaphragm 73 to flex inwardly and the struts 98, 98 to rock in a counterclockwise direction about the shaft 99 from the position in which they are shown in the drawing. This inward flexing of diaphragm 73 causes the follower 79 to move out of contact with the exhaust valve 83 and fluid under pressure in chamber 77 will flow to atmosphere through passage 81, port 82, chamber 66, and opening 67. When the pressure of fluid in chamber 77 has been reduced to substantially atmospheric pressure, struts 98, 98 will rock in a clockwise direction about shaft 99 to the position in which they are shown in the drawing.

It should here be understood that, while the pressure of fluid obtained in chamber 77 may correspond to the pressure of fluid supplied to chamber 75, during operation such as above described in connection with an empty vehicle, the ratio of pressure of fluid in chamber 77 to that in chamber 75 may be varied from 100% to zero in a manner about to be described. This ratio will be selected by the loaded condition of the vehicle.

Let us now consider the operation which will occur when the vehicle or car is partially loaded. Under this condition the yoke 100 and struts 98 will be disposed in an angular position, such as that illustrated diagrammatically in Fig. 4 and hereinafter more fully described, about the stub shafts 101 somewhere between the position in which it is shown in Fig. 1 for an empty car and the position in which the yoke 100 engages or contacts the boss 168, as previously mentioned, for braking a fully loaded vehicle. This angular position will be obtained in the operation of the weighing mechanism 9, the relay valve device 7 and the load compensating valve mechanism 8 when the fluid pressure brake equipment is initially charged with fluid under pressure, or when the brakes are released after an emergency application, in which the brake pipe is charged from atmospheric pressure to normal operating pressure.

With the various parts of the device of the load compensating valve device 8 in the position in which they are shown in section in Fig. 1 and in diagram in Fig. 3, the axes of the diaphragms 73 and 146 and their respective followers 79 and 96 will lie at a fixed angle of 90° from each other, and each being at an angle of 45° from the same vertical plane in which the median lines of the struts 98 also lie, the ratio between the pilot and delivery pressure in chambers 75 and 77, respectively, will be one to one so that the fluid pressures in chambers 75 and 77 would be substantially the same.

Under this condition it is desired that fluid be delivered to load compensating, or counter-pressure, chamber 33 in brake cylinder device 10 at some lesser degree of pressure than that required for braking an empty vehicle, which degree should be proportioned inversely according to the load on the vehicle. In the normal course of operation of initially charging the brake equipment, or recharging after an emergency application of the brakes has been made, as the case might be, the load measuring mechanism 9 will operate the relay valve device 7 hydraulically to supply pneumatic fluid under pressure to weighing pipe 47 at a degree proportionate to the degree of load on the vehicle. This pneumatic pressure present in chamber 117 will act on diaphragm 107 to cause the yoke 100 and thereby the struts 98, to rock counterclockwise about the pin 95 through an angular displacement corresponding to the degree of load carried by the vehicle.

With the shaft 99 thus moved toward the right hand from the position in which it is shown in the drawing at the time an application of brakes is effected, the torque arm of the force from the pilot diaphragm 70 is reduced with respect to that of the force from diaphragm 73. This will give a mechanical advantage to the force acting on diaphragm 73 since the component of force exerted by the diaphragm 73 through stem and follower 79 on said struts in the direction of diaphragm 70 acting on stem 97 is increased by reason of the decrease in angularity between the stem 79 and said struts.

With the diminishing effectiveness of fluid pressure acting in chamber 75 on diaphragm 70 to supply fluid under pressure to counter-pressure chamber 33 as the load increases the power of piston 25 to apply the brakes in response to the pressure of fluid supplied from brake cylinder pipe 27 will be increased corresponding to the increase in load carried by the vehicle.

Considering the diagram shown in Fig. 3 in detail, the reference numerals shown indicate in diagram form the corresponding parts designated by the same numerals in Fig. 1. As previously stated, the stems 93 and 97 are disposed at a fixed angle of 90° to each other. The strut 98, as indicated in Fig. 3, is positioned for braking an empty vehicle, the directional magnitude of which is indicated by the line BA disposed at an angle of 135° to both stem 93 and stem 97. The direction and magnitude of the control pressure exerted at P by diaphragm 70 on stem 97 is indicated by the line AC extended from, and in line with, the stem 97. A parallel direction and magnitude of the load compensating pressure exerted at L by diaphragm 73 on stem 93 is indicated by the line CB, which closes the triangle ABC since the forces exerted by the stems 93, 97 and the strut 98 are in equilibrium. The force L exerted through the stem 93 to maintain the equilibrium will be equal to P times the sine of the angle G. In this case G=45° and, since the tangent of 45°=1, L=P in the condition for the braking of an empty vehicle. Therefore, the load compensating chamber pressure will vary directly with the main pressure chamber pressure in a one-to-one ratio when braking an empty vehicle.

Upon referring to Fig. 4, it will be observed that the same designations are used as in Fig. 3. In this case, however, the strut 98 has been rotated counterclockwise through 22½° to a position for braking a half-loaded vehicle, thus making angle G formed between lines AB and AC equal to 22½°. The force exerted by L through stem 93 to maintain equilibrium will be equal to P times the tangent of 22½°, which equals P times .4142. Thus if the pressure of fluid supplied to main pressure chamber 26 is 20 pounds, the pressure of fluid supplied to the load compensating chamber 33 will be .4142 times that, or 8.284 pounds, to correspondingly reduce the braking power to that required for braking a half-loaded vehicle.

In view of the foregoing it is believed that the Fig. 5 will be readily understood to be the diagram of forces involved in the condition for braking a loaded vehicle. In this condition, the angle G=0°. Since the tangent of 0=0, there will be no component force exerted by L at 73 to be expressed by a line CB. Consequently, the full pressure exerted at P will be available in main chamber 26 in the brake cylinder device 10 for braking a loaded vehicle.

*Summary*

From the above description it will now be seen that I have provided an improved compensating valve device adapted to deliver fluid to a load compensating, or counter-pressure, chamber in a brake cylinder device for a fluid pressure brake equipment at pressures which are varied directly according to the pressure in the main pressure chamber and brake cylinder pipe 17 and inversely according to the load on the vehicle. The pressures of fluid to be delivered to the counter-pressure chamber are balanced against and varied with those in a control chamber connected to the main pressure chamber in the brake cylinder device, the proportion being determined by a novel mechanism which varies the angle of thrust exerted by the control pressure, and thereby the proportion of braking, according to the load carried by the vehicle.

Having now described my invention, what I claim as new and desire to secure by Letters Patent, is:

1. In a load compensating fluid pressure brake equipment for a railway vehicle, a brake cylinder having a main chamber and an opposing load compensating chamber, and a load compensating valve device comprising in combination, one movable abutment means subject to pressure of fluid in said main chamber and comprising a thrust member, another movable abutment means subject to pressure of fluid in said load compensating chamber and comprising another thrust member disposed at a fixed angle less than a straight angle to the first mentioned member, valve means operable by both movable abutments in accordance with variations in said main chamber pressure to effect proportional variations in pressure of fluid in said load compensating chamber, a strut, means pivotally connecting adjacent ends of said thrust members to each other and to one end of said strut, supporting means carrying the opposite end of said strut and thereby said thrust members and adjustable to vary direction of action of said strut on said thrust members through an arc between the directions of action of said thrust members to thereby provide a ratio between said pressures, when balanced, corresponding to the angular relation of the direction of action of said strut to that of said thrust members, and load responsive means connected to said supporting means operable to adjust same according to the load on the vehicle.

2. In a load compensating fluid pressure brake equipment for a railway vehicle, a brake cylinder having a main chamber and an opposing load compensating chamber, and a load compensating valve device comprising in combination, a pivot member, a force applying member subject to pressure of fluid in said main chamber and a force receiving member subject to pressure of fluid in said load compensating chamber, valve means controlled by said members and responsive to pressure of fluid in said main chamber to supply fluid under pressure to said load compensating chamber in different degrees corresponding to the force exerted by said force applying member, said members being pivotally connected to each other and to said pivot member with their directions of thrust diverging at an angle less than a straight angle, an adjustable pivot for said pivot member spaced away from and adjustable about the pivotal connections with said force applying and receiving members through an arc between said directions of thrust for varying the effectiveness of said force applying member, and load responsive means for adjusting said pivot member about said pivotal connections in accordance with the weight of the load carried by the vehicle.

3. In a load compensating fluid pressure brake equipment for a railway vehicle, a brake cylinder having a main chamber and an opposing load compensating chamber, and a load compensating valve device comprising in combination, a force transmitting member subject to pressure of fluid in said main chamber and a force receiving member subject to pressure of fluid in said load compensating chamber arranged at an angle less than a straight angle relative to each other, valve means controlled by said members responsive to pressure of fluid in said main chamber to supply fluid under pressure to said load compensating chamber in variations corresponding to the force exerted by said force transmitting member, a pivot member, means pivotally connecting one end of said pivot member to the adjacent ends of said transmitting and receiving members, an adjustable pivot for the other end of said pivot member arranged with its adjusting axis parallel to that of the pivotal connections with said transmitting and receiving members and adjustable through an arc between the directions of action of said force transmitting and receiving members, and load responsive means for varying the effectiveness of said force transmitting member by adjusting said axis of said adjustable pivot about said pivotal connections in accordance with the weight of the load carried by the vehicle.

4. In a load compensating fluid pressure brake equipment for a railway vehicle, a brake cylinder having a main chamber and load compensating chamber, and a load compensating valve device comprising in combination, a link, an adjustable pivot for one end of said link, load responsive means for adjusting said pivot, a pair of thrust elements arranged at an angle less than a straight angle relative to each other, pivot means arranged outside of said angle with its axis parallel to that of said adjustable pivot pivotally connecting adjacent ends of said elements to the opposite end of said link, movable abutment means subject to pressure of fluid in said main chamber for applying a control force to one of said thrust elements in a direction toward said pivot means, and movable abutment means subject to pressure of fluid in said main chamber operative by said force applied to said one thrust element to supply fluid under pressure to said load compensating chamber and operate the other thrust element to apply force to said other thrust element opposing and balancing the first named force.

5. In a load compensating fluid pressure brake equipment for a railway vehicle, a brake cylinder having a main chamber and a load compensating chamber, and a load compensating valve device comprising, in combination, a link, an adjustable pivot for one end of said link, load responsive means for adjusting said pivot according to the weight of the load carried by the vehicle, a pair of thrust elements arranged at an angle less than a straight angle relative to each other, pivot means arranged outside of said angle with its axis parallel to that of said adjustable pivot pivotally connecting adjacent ends of said elements to the opposite end of said link, one movable abutment subject to pressure of said main chamber for applying a control force to one of said thrust elements in a direction toward said pivot means, another movable abutment subject to pressure of said load compensating chamber connected to the other thrust element operable by fluid under pressure being supplied to said compensating chamber to oppose the thrust of said one thrust element, and valve means operable by movement of said elements to provide fluid to said load compensating chamber to balance the thrust of said first thrust element.

References Cited in the file of this patent

UNITED STATES PATENTS

| | | |
|---|---|---|
| 976,000 | Schenck | Nov. 15, 1910 |
| 2,525,239 | Pickert | Oct. 10, 1950 |
| 2,534,622 | Pickert | Dec. 19, 1950 |